United States Patent
Kolin

[15] 3,661,148
[45] May 9, 1972

[54] INDUCTION TYPE ARTERY GAGE
[72] Inventor: Alexander Kolin, Bel Air, Calif.
[73] Assignee: Regents of the University of Calif., Berkeley, Calif.
[22] Filed: Apr. 13, 1970
[21] Appl. No.: 27,516

[52] U.S. Cl..................128/2.05 P, 33/147 N, 128/2.05 V, 128/2 S, 324/71
[51] Int. Cl. .........................................................A61b 5/02
[58] Field of Search ................128/2, 2.05 F, 2.05 R, 2.05 D, 128/2.05 P, 2.05 V; 33/147 N; 324/34, 37, 10, 71

[56] References Cited

UNITED STATES PATENTS

| 2,534,632 | 12/1950 | Smith | 33/147 N |
| 2,622,126 | 12/1952 | Bender et al. | 324/37 |
| 2,622,125 | 12/1952 | Bender | 324/37 |
| 3,449,662 | 6/1969 | Wood | 324/37 |
| 2,649,573 | 8/1953 | Goldberg et al. | 324/34 X |
| 2,667,159 | 1/1954 | Goldberg et al. | 128/2.05 |

Primary Examiner—Richard A. Gaudet
Assistant Examiner—Kyle L. Howell
Attorney—Jessup & Beecher

[57] ABSTRACT

An improved induction type gage is provided which is intended to be used to measure the diameter of a blood vessel within a living subject, and to provide a means for detecting and measuring slight pulsating variations in the diameter of the blood vessel. The gage includes, for example, a collapsible frame and primary and secondary electric inductance windings attached to the frame. The gage may be introduced percutaneously, for example, into the blood vessel to be measured, and it is constructed to constrict as it is so introduced and subsequently to expand when it has entered the blood vessel to span the inner diameter of the blood vessel. An alternating electric current is then passed through the primary winding and the resulting voltage induced in the secondary winding is measured and is an indication of the diameter of the blood vessel.

5 Claims, 2 Drawing Figures

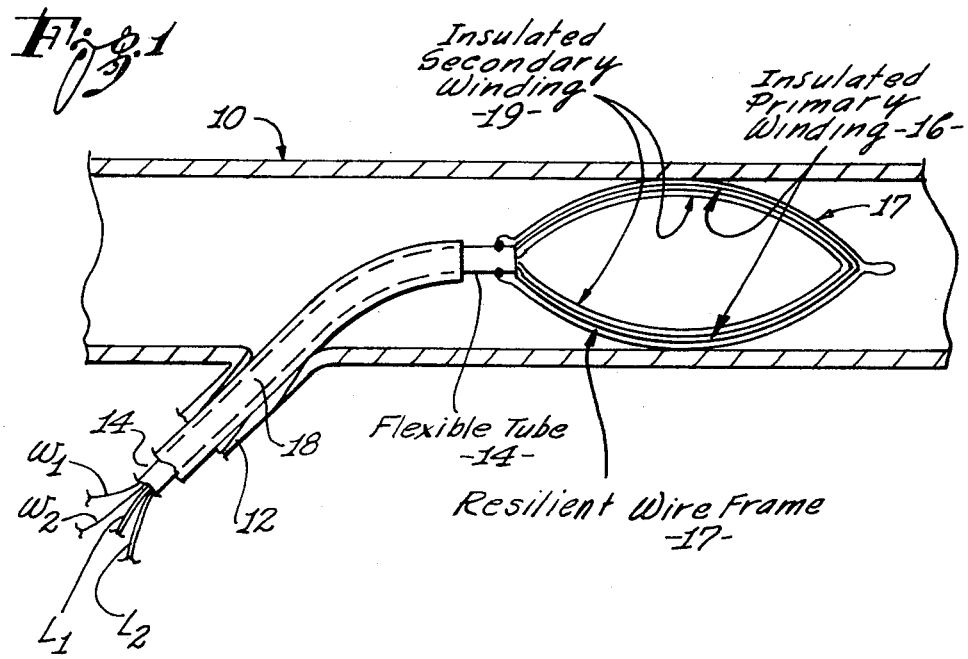
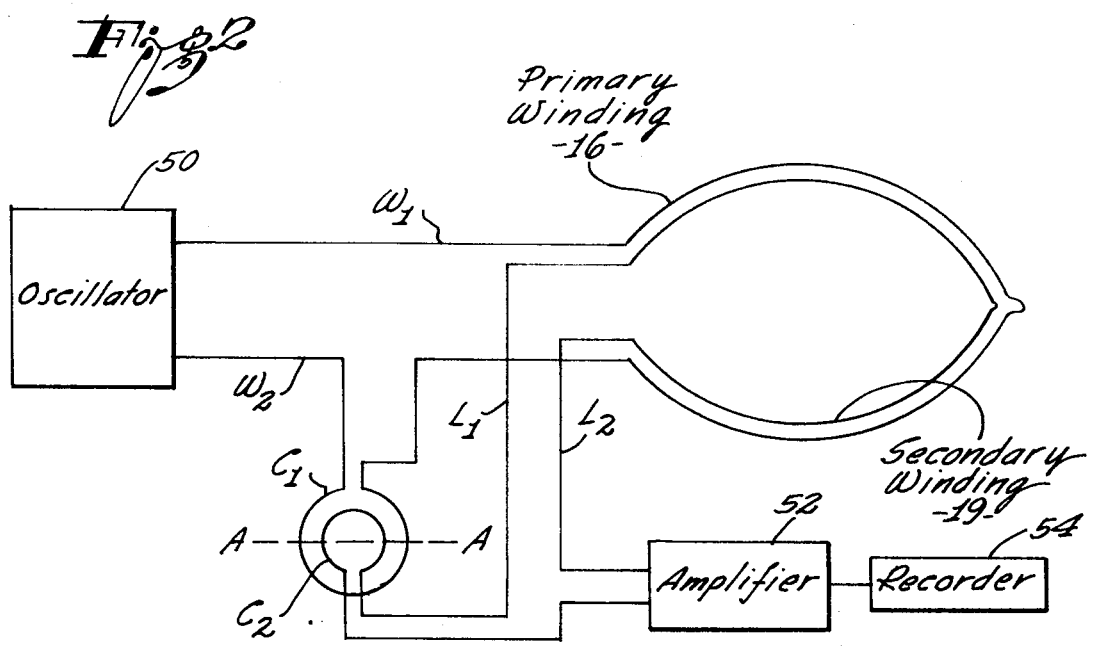

INDUCTION TYPE ARTERY GAGE

BACKGROUND OF THE INVENTION

Copending application Ser. No. 874,094 filed Nov. 3, 1969 discloses an electromagnetic catheter type flowmeter transducer in which a magnetic field is generated by an electric inductance coil or winding which is inserted into the patient or animal under test. The transducer described in the copending application may be introduced, for example, through a branch artery into the main artery to measure blood flow in the main artery. The transducer is constructed to constrict as it is introduced through the branch artery and to expand resiliently in the main artery to span the entire diameter of the main artery. The transducer described in the copending application can also be passed from the main artery into a branch artery for measurement of the blood flow in the branch artery, and it can also be used in the veins, and other tubular organs.

The gage of the present invention is somewhat similar in its construction to the transducer described in the aforesaid copending application, in that it is constructed so that it too may be collapsible in order that the problem of excessive dimensions of the gage may be solved. This permits the gage of the present invention, as was the case with the catheter type electromagnetic flowmeter of the copending application, to lend itself conveniently for introduction percutaneously through a small opening in the skin of the patient.

The gage of the present invention, as mentioned above, includes a primary and secondary inductance winding, and it is of the catheter type so that it may be inserted directly into the blood vessel whose diameter is to be measured. An important feature of the gage of the invention is its resilient collapsibility to a transverse dimension of about 2.7 millimeters, for example, which is required for percutaneous introduction; and in its subsequent ability to enlarge and expand itself resiliently so as to adapt its transverse dimension to correspond to the interior diameter of the particular blood vessel or other conduit in which it is inserted, as well as to expand and contract rapidly and follow rapid variations in the diameter of a pulsating blood vessel.

The gage can be also used inside the gastrointestinal tract to monitor peristaltic contractions and/or spasms of intestines and esophagus and in the trachea or bronchi to study their spasms.

The invention provides, therefore, an improved catheter-type gage, which is collapsible, and which may be inserted percutaneously into the patient and subsequently into the blood vessel whose diameter is to be measured. The gage of the invention includes primary and secondary inductance windings, so that when an alternating current is introduced into the primary winding, a voltage is induced across the secondary whose value is a measure of the internal diameter of the blood vessel in which the gage is inserted. The latter voltage may be measured, for example, by an alternating-current voltmeter which is calibrated directly, for example, in millimeters or other dimensional units.

In general, the gage can be used to measure the diameter of any biological canal and of its variations in diameter.

BRIEF DESCRIPTION OF THE DRAWINGS

FIG. 1 is a schematic representation of an induction type artery gage constructed in accordance with the concepts of the present invention, and illustrated as being inserted through an arterial branch into a main artery within a patient, so that it may be used to measure the internal diameter of the main artery; and FIG. 2 is a schematic circuit diagram of the gage of FIG. 1, and showing appropriate external circuitry and circuit elements which are used to adapt the gage particularly to measure slight pulsating variations in the diameter of the blood vessel in which it is inserted.

DETAILED DESCRIPTION OF THE ILLUSTRATED EMBODIMENT

In the representation of FIG. 1, the wall of a main artery, or other blood vessel or biological canal, into which the induction type catheter gage of the invention is inserted is represented by the numeral 10; and the wall of a branch artery, through which the gage is inserted into the main artery 10 is designated by the numeral 12. The instrument of the invention includes a catheter section which is in the form, for example, of a flexible tube 14 through which a pair of wires $L_1$ and $L_2$, and a further pair of wires $W_1$ and $W_2$ extend. The wires $W_1$ and $W_2$ are connected to an appropriate insulated primary inductance winding 16 of a selected number of turns, and the wires $L_1$ and $L_2$ are connected to an insulated secondary inductance winding 19, likewise of a selected number of turns.

The windings 16 and 19, as shown in FIG. 1, have a generally lenticular or oval shape, and are adapted to be compressed into an elongated configuration of a transverse dimension, as mentioned, of about 2.7 millimeters, for percutaneous introduction through the arterial branch 12 into the artery 10. To insure that the windings 16 and 19 maintain the illustrated lenticular shape, a frame 17 of this shape made, for example, from a resilient stainless steel wire, is used as a support for the windings. The two sides of the windings 16 and 19 are collapsed toward one another to enable the assembly to pass through a narrow opening, as mentioned above, and the sides of the windings spring open again under the influence of the resilient frame 17, after emerging into a wider space. In this way the assembly is able to assume the inner diameter of the conduit in which it is placed.

The resilient frame 17 for the windings may be formed, for example, of a 10 mil, stainless steel wire whose ends are soldered to the end of the tube 14. The tube 14 may, for example, be of 18 gage stainless steel hypodermic tubing. The individual wires of the windings 16 and 19 may be threaded through silicone rubber tubing, such as Dow Corning "Silastic" medical grade 0.025 inches inner diameter, and 0.047 inches outer diameter, for insulation purposes. An alternative method of insulation would be to paint the wires with, for example, an insulating cement such as General Electric RTV112 Silastic cement; or to coat them with Teflon or silicone rubber, or other material compatible with blood and which will not coagulate the blood. The flexible metal tube 14 may be coated, for example, with a layer 18 of silicone rubber or other suitable material. All outer surface of the catheter in contact with blood can be treated with heparin to suppress blood clotting. The preferred implementation uses the stainless steel wire frame as the primary (or secondary) winding (in which case its ends are not both soldered to the stainless steel tube 14). A fine wire guided along the loop then serves as a secondary (or primary) winding.

A current, for example, of 0.5-1 amps may be passed through the primary winding 16 to generate a magnetic field within the artery 10, and this field links the secondary winding 19. The resulting voltage induced in the secondary winding depends on the transverse dimension of the two windings, which, in turn, depends upon the inner diameter of the artery 10. Therefore, the leads $L_1$ and $L_2$ may be connected to an appropriate indicating device, which measures the voltage generated across the secondary winding, and which may be calibrated directly in dimensional units.

The shape of the windings 16 and 19 and of the supporting frame 17 is not critical. However, the loop defined by these elements is preferably shaped so as to provide a linear relationship between the secondary output voltage and artery diameters over a wide dimensional range, so as to facilitate the calibration of the apparatus.

As mentioned above, the gage may also be used to detect extremely small variations in the diameter of the blood vessel in the presence, for example, of pulsating blood flow. A preferred circuit for detecting such small diameter variations is disclosed, for example, in FIG. 2. The gage itself is not shown structurally in FIG. 2, and only one primary turn 16 and one secondary turn 19 are shown. (The one turn embodiment is actually preferred). In the circuit of FIG. 2, an AC current supply 50 is connected to the primary winding 16, and this current supply provides the alternating-current in the primary winding. The current is passed through a coil $C_1$ of a compensating unit, the coil $C_1$ being connected in series with the primary winding, as shown. The compensating unit also includes a second coil $C_2$ which may be turned around an axis A—A relative to the coil $C_1$, this construction being well established in the compensator unit art. The coil $C_2$ is connected in series with the secondary winding 19 and input of an amplifier 52. The output of the amplifier is applied to an appropriately calibrated recorder 54.

In order to detect extremely small variations in the arterial wall diameter, the current supply 50 supplies the alternating-current to the primary winding 16, and the resulting voltage derived across the secondary winding is nulled for the particular arterial diameter in which the unit is inserted, this being achieved by turning the coil $C_2$ to achieve the null point. This permits the amplifier 52 to be of a high gain, low noise type, so that the small voltage pulses which appear across the secondary winding in response to small pulsations in the diameter of the blood vessel, may be greatly amplified and applied to the indicator 54 to monitor incremental changes in artery diameter.

Therefore, the gage of the present invention may be used to study the elasticity, for example, of arteries and to measure the degree of arteriosclerosis, when measures of blood pressure are combined with readings by the gage. The gage described above is useful not only in the study of the elasticity and dimensions of arteries, and other blood vessels. For example, the gage may be introduced into the intestines to study peristalsis; or into the esophagus or bronchi, or other canal-like organs, whose activity is capable of modifying the transverse dimension of the gage which can thus detect their passive or spastic contraction or relaxation.

It will also be appreciated that although a particular embodiment of the invention has been shown and described, modifications may be made. It is intended in the following claims to cover all modifications which come within the spirit and scope of the invention.

What is claimed is:

1. An electromagnetic type catheter gage for measuring the inner diameters of conduits, or the like, comprising: a primary inductance winding having first and second sides defining a loop, said sides being resiliently biassed from one another and collapsible towards one another; electric lead means connected to said primary winding for connection to an alternating current supply to cause alternating current to flow through said primary winding; a secondary inductance winding mounted in an electromagnetic inductive relationship with said primary winding and across which a voltage is induced, said secondary windings having first and second sides adjacent said first and second sides of said primary winding to define said loop, said sides of said secondary winding being resiliently biassed from one another and collapsible towards one another, the voltage induced across said secondary winding being a function of the transverse dimension of said loop; metering means for measuring the voltage across said secondary winding; and further electric lead means connecting said secondary winding to said metering means.

2. The electromagnetic gage defined in claim 1, and which includes a loop-shaped resilient frame attached to at least one of said windings for maintaining said first and second sides thereof resiliently spaced from one another.

3. The electromagnetic gage defined in claim 1, and which includes a loop-shaped resilient frame of electrically conductive material and serving as one of the aforesaid windings.

4. The electromagnetic gage defined in claim 2, and which includes a flexible tubular member attached to said loop-shaped resilient frame and serving as a conduit for said electric leads.

5. The electromagnetic gage defined in claim 2, in which said loop-shaped resilient frame is formed of stainless steel.

* * * * *